US012801461B2

(12) United States Patent
Thunuguntla et al.

(10) Patent No.: US 12,801,461 B2
(45) Date of Patent: Nov. 17, 2026

(54) SELECTIVE MUTUAL EXCLUSIVITY OF BOOTSTRAP AND MATERIALIZATION

(71) Applicant: Intuit Inc., Mountain View, CA (US)

(72) Inventors: Saikiran Sri Thunuguntla, Bangalore (IN); Suman Ghosh, Bangalore (IN); Vishal Reddy Baddam, Bangalore (IN); Prashanth Seshadri, Bangalore (IN)

(73) Assignee: Intuit Inc., Mountain View, CA (US)

( * ) Notice: Subject to any disclaimer, the term of this patent is extended or adjusted under 35 U.S.C. 154(b) by 342 days.

(21) Appl. No.: 18/775,270

(22) Filed: Jul. 17, 2024

(65) Prior Publication Data

US 2026/0023625 A1 Jan. 22, 2026

(51) Int. Cl.
*G06F 9/52* (2006.01)
*G06F 11/14* (2026.01)

(52) U.S. Cl.
CPC ............ *G06F 9/52* (2013.01); *G06F 11/1405* (2013.01)

(58) Field of Classification Search
CPC ............... G06F 16/215; G06F 16/2379; G06F 16/2477; G06F 16/27; G06F 16/1873; G06F 16/214; G06F 16/219; G06F 16/2358; G06F 16/254; G06F 2211/1035
See application file for complete search history.

(56) References Cited

U.S. PATENT DOCUMENTS 10,216,820 B1 2/2019 Holenstein et al.
10,339,147 B1 * 7/2019 Barmes .................. G06N 5/046
10,459,760 B2 10/2019 Scheuer
10,909,109 B1 * 2/2021 Kambhampati .... G06F 16/2282
11,023,493 B2 6/2021 Xiang et al.
2006/0053139 A1 3/2006 Marzinski et al.
2011/0213923 A1 9/2011 Ledford
2012/0210189 A1 8/2012 Sugihara et al.
(Continued)

FOREIGN PATENT DOCUMENTS

CN 116069864 A 5/2023
WO WO-02096017 A2 * 11/2002 ........... H04L 9/0894

OTHER PUBLICATIONS

Akai et al. "Fine-Grained Replication and Scheduling with Freshness and Correctness Guarantees" VLDB Conference, 2005, pp. 1-12.*

*Primary Examiner* — Charles E Anya
(74) *Attorney, Agent, or Firm* — Paradice & Li LLP

(57) ABSTRACT

Systems and methods for selectively running data management jobs in a mutually exclusive manner are disclosed. An example method is performed by one or more processors of a job coordination system and includes receiving a transmission over a communications network from a computing device associated with a user of the job coordination system, the transmission including a request to perform a data repair job on one or more data assets and a user preference indicating whether data accuracy or data freshness is to be prioritized, and selectively running the data repair job and a data update job in a mutually exclusive manner based on the user preference, the selective running including preventing the data repair job from overlapping with the data update job when the user preference is data accuracy, and allowing the data repair job to overlap with the data update job when the user preference is data freshness.

20 Claims, 3 Drawing Sheets

(56) References Cited

U.S. PATENT DOCUMENTS

| | | | | |
|---|---|---|---|---|
| 2013/0024431 | A1* | 1/2013 | Parthasarathy | G06F 16/1748 707/723 |
| 2013/0125129 | A1 | 5/2013 | Chakravorty et al. | |
| 2020/0081899 | A1 | 3/2020 | Shapur et al. | |
| 2020/0364240 | A1 | 11/2020 | Martin et al. | |
| 2021/0011891 | A1 | 1/2021 | Soza | |
| 2021/0326359 | A1 | 10/2021 | Upton et al. | |
| 2021/0406939 | A1* | 12/2021 | Moshkovich | G06F 16/215 |
| 2022/0012188 | A1 | 1/2022 | Durham et al. | |
| 2022/0019367 | A1 | 1/2022 | Freilich et al. | |
| 2023/0096118 | A1* | 3/2023 | Ramsl | G06F 40/30 707/736 |
| 2023/0409535 | A1 | 12/2023 | Kashi et al. | |
| 2023/0412375 | A1 | 12/2023 | Bisht et al. | |
| 2024/0004898 | A1 | 1/2024 | Bindal et al. | |
| 2024/0264986 | A1* | 8/2024 | Liu | G06F 16/215 |
| 2024/0281413 | A1 | 8/2024 | Kashi et al. | |
| 2025/0086180 | A1 | 3/2025 | Kavalakuntla | |
| 2025/0328526 | A1 | 10/2025 | Nandi et al. | |

* cited by examiner

SELECTIVE MUTUAL EXCLUSIVITY OF BOOTSTRAP AND MATERIALIZATION

CROSS-REFERENCE TO RELATED APPLICATION

This application is related to U.S. patent application Ser. No. 18/775,162 entitled "PARALLEL BOOTSTRAP AND MATERIALIZATION WITH INTELLIGENT RESOLUTION" and filed on Jul. 17, 2024, which is assigned to the assignee hereof. The disclosures of all prior Applications are considered part of and are incorporated by reference in this Patent Application.

TECHNICAL FIELD

This disclosure relates generally to systems and methods for intelligent job processing, and specifically to selectively running data management jobs in a mutually exclusive manner.

DESCRIPTION OF RELATED ART

Organizations increasingly rely on accurate data to inform and support data-driven decision-making. As a result, data quality assurance and data management have become increasingly critical tasks. Artificial intelligence (AI)-driven platforms, in particular, require high-quality datasets to enable experts that use these platforms to generate meaningful insights and decisions. However, coordinating data management tasks is even more challenging when multiple data management jobs overlap or conflict, potentially causing inconsistencies and/or confusion about which data source holds the most authoritative information, such as a most recent snapshot.

For example, one data management job type might focus on ensuring that the most up-to-date data is available (such as a materializer job), while another data management job type might prioritize comprehensive data repair up until a particular point in time (such as a bootstrap job). These jobs, while individually valuable, may disrupt each other if allowed to operate without careful coordination. Issues can arise when these jobs need access to shared resources (e.g., a snapshot storage location in a target database), where overwriting the wrong data at the wrong time can lead to severe data integrity consequences for downstream jobs. The result can be a race condition where the correct outcome depends on an unpredictable order in which the jobs are executed and/or completed.

Conventional systems often attempt to resolve such conflicts through scheduling procedures, such as by scheduling bootstrap jobs to run at night and materializer jobs to run during the day. However, this approach can place a heavy burden on manual operations teams and may also lack the flexibility to adapt to changing business needs, particularly as the amount of data and the daily number of jobs increases. Furthermore, as manual intervention is often slow and prone to error, such solutions tend to be less reliable and introduce additional costs and delays as the amount and/or complexity of the data increases. In other words, conventional systems are incapable of making intelligent, context-aware decisions about job prioritization, leading to wasted resources and data inconsistencies.

Without a reliable method for effectively coordinating data management jobs, inefficiencies and data inconsistencies will remain. What is needed is a system that can intelligently coordinate jobs of different types without sacrificing valuable time and/or flexibility. Furthermore, what is needed is a system that can do so while also dynamically determining whether and when to execute jobs of different types, such that organizations can effectively optimize and balance efficiency with data integrity.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for selectively running data management jobs in a mutually exclusive manner. An example method is performed by one or more processors of a job coordination system and includes receiving a transmission over a communications network from a computing device associated with a user of the job coordination system, the transmission including a request to perform a data repair job on one or more data assets, and the transmission further including a user preference indicating whether data accuracy or data freshness is to be prioritized, and selectively running the data repair job and a data update job in a mutually exclusive manner based on the user preference, the selective running including preventing the data repair job from overlapping with the data update job when the user preference is data accuracy, and allowing the data repair job to overlap with the data update job when the user preference is data freshness.

Another innovative aspect of the subject matter described in this disclosure can be implemented in a system for selectively running data management jobs in a mutually exclusive manner. An example system includes one or more processors and a memory storing instructions for execution by the one or more processors. Execution of the instructions causes the system to perform operations including receiving a transmission over a communications network from a computing device associated with a user of the system, the transmission including a request to perform a data repair job on one or more data assets, and the transmission further including a user preference indicating whether data accuracy or data freshness is to be prioritized, and selectively running the data repair job and a data update job in a mutually exclusive manner based on the user preference, the selective running including preventing the data repair job from overlapping with the data update job when the user preference is data accuracy, and allowing the data repair job to overlap with the data update job when the user preference is data freshness.

Another innovative aspect of the subject matter described in this disclosure can be implemented as a non-transitory computer-readable medium storing instructions that, when executed by one or more processors of a system for selectively running data management jobs in a mutually exclusive manner, cause the system to perform operations. Example operations include receiving a transmission over a communications network from a computing device associated with a user of the system, the transmission including a request to perform a data repair job on one or more data assets, and the transmission further including a user preference indicating whether data accuracy or data freshness is to be prioritized, and selectively running the data repair job and a data update job in a mutually exclusive manner based on the user preference, the selective running including preventing the data repair job from overlapping with the data update job when the user preference is data accuracy, and allowing the data repair job to overlap with the data update job when the user preference is data freshness.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
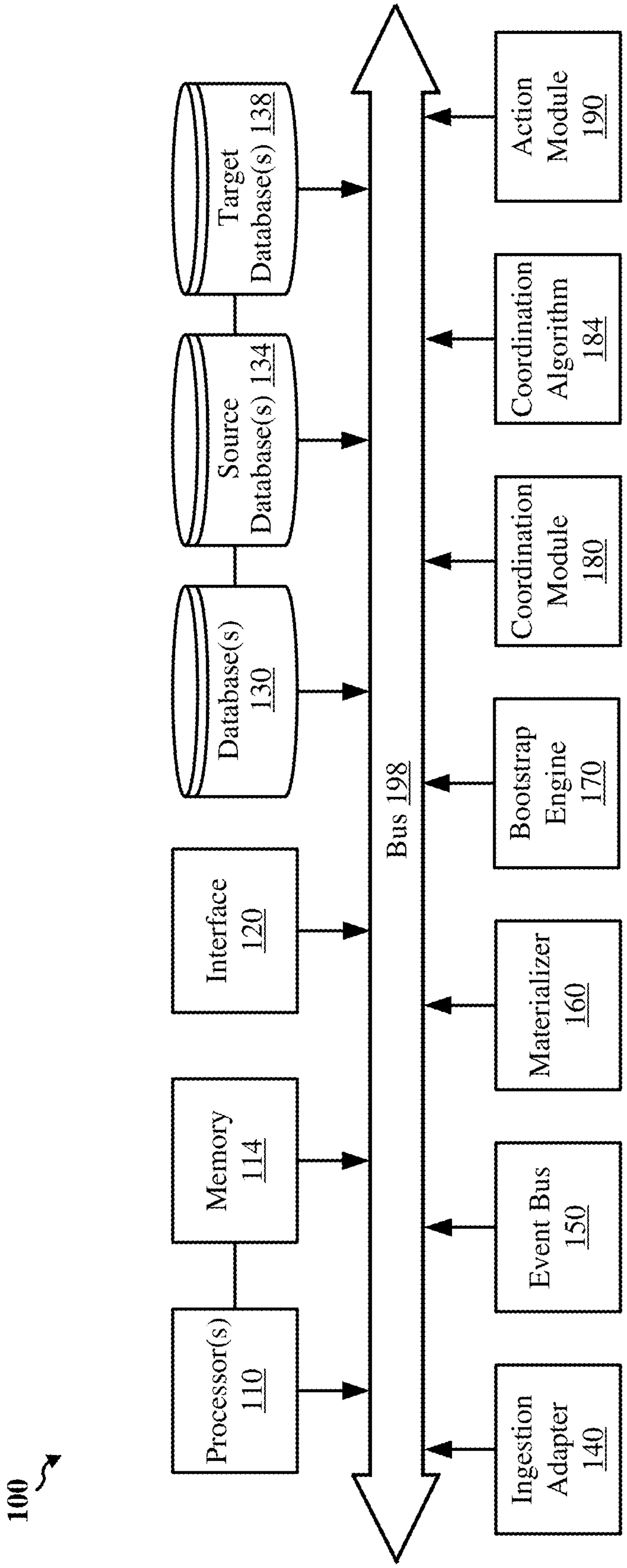
FIG. 1 shows a system, according to some implementations.

As described above, organizations increasingly depend on accurate data for data-based decision making, especially for AI-driven platforms that require high-quality datasets to generate meaningful insights. However, conventional systems lack effective coordination of data management jobs, which often leads to conflicts, inefficiencies, and data inconsistencies. Thus, there is a need for an intelligent system that can coordinate such jobs efficiently and effectively. In addition, there is a need for a system that can do so while also dynamically determining whether and when to execute jobs of different types (e.g., materializer and bootstrap jobs), such as by dynamically determining whether to execute the jobs in a mutually exclusive manner. Furthermore, as different users have different data needs and uses, an ideal system will determine and adapt its procedures to the preferences of individual users.

For purposes of discussion herein, source data may be stored in source databases that are used for storing data related to various services offered by an organization (e.g., social media, financial management, expert analysis, etc.). The source databases may operate as Online Transaction Processing (OLTP) databases and may constantly be subjected to operations such as inserts, updates, and deletes that are recorded in binary (or "bin") logs. While the source databases are effective for supporting basic user interactions (e.g., in mobile and web platforms), they are not optimized for the analytical purposes of data experts. Thus, various adapters (e.g., ingestion adapters) may extract data from the bin logs, incorporate the extracted data into various event buses (e.g., Kafka-like systems), and perform one or more materialization processes that replicate the source data in one or more target databases (e.g., DataLakes) for expert analytical use. Non-limiting examples of expert analytical use include data queries for purposes of trend analysis to uncover patterns and correlations over time, user and/or customer segmentation for identifying valuable groups based on behavioral and demographic data, predictive analytics for forecasting future trends and behaviors, sentiment analysis to assess user and/or customer attitudes and feedback, and the like. The process of transitioning the source data from its original form in the source databases to its replicated form in the target databases may be referred to as an ingestion process or a merge process, and particular ingestion-based jobs may include materialization jobs, bootstrap jobs, and the like.

For purposes of discussion herein, a materialization job may be for providing the most up-to-date (or "fresh") data to a target database (e.g., a DataLake), such as by bringing in the most recent changes that occurred in the source databases (e.g., since a most recent checkpoint) and merging the changes with corresponding datasets in the target database. After the merge, the default logic of the materializer job may generate and store a new snapshot table of the updated data in the target database. For example, a snapshot stored in Hadoop Distributed File System (HDFS) format may be a read-only copy of the entire file system at the moment in time that the materializer job was run. In this manner, the snapshot may function as a static baseline representation of the updated data at that time. Typically, certain metadata (e.g., a Hive table metadata location) is then updated to point to the most recent snapshot location. At a subsequent time, changes that occurred since the most recent checkpoint may be ingested, and a subsequent job may generate and store a new snapshot reflecting the most recent changes. The new snapshot includes a new memory location for each file and becomes the new baseline snapshot. This cycle repeats with each job such that each most recent snapshot consistently represents the most up-to-date state of the data. By repeatedly using the latest snapshot, the materializer prevents data duplicates, conflicts, and inconsistencies.

For purposes of discussion herein, a bootstrap job may be for establishing and maintaining the accuracy and quality of data (e.g., by repairing the data) within a target database (e.g., a DataLake), such as when source data is brought into the DataLake for the first time (an initial load), or when there are data issues that need fixing within existing data. In this manner, a bootstrap job can be used to ensure that the DataLake remains consistent and accurate after changes occur in source data, such as data type modifications, encryption requirements for sensitive information, or fixes to missing data caused by source data system errors. In other words, bootstrap jobs are used to ensure that a target database (such as a DataLake) remains reliable and free from quality problems caused by source issues, schema changes, bugs, infrastructure failures, or the like. By addressing these issues, bootstrap jobs enable downstream applications that rely on the DataLake to have access to accurate and trustworthy historical information. Similar to the materializer job, the default logic of the bootstrap job may generate and store a new snapshot table of the repaired data in the target database.

Some organizations may implement and follow various service level agreements (SLAs) that govern the organization's data ingestion practices. The SLAs may function as agreements between data providers and data consumers and establish measurable expectations for the relevant data pipelines. Materializer jobs may generally be tied to SLAs, while bootstrapping jobs generally may not. Example SLA metrics include expectations for data freshness (e.g., how recent of data is available), data accuracy (e.g., how well the data reflects reality), data completeness (e.g., a percentage of data successfully ingested), and data availability (e.g., how consistently the data is accessible). For purposes of discussion herein, materializer jobs may ensure that the data is fresh, and bootstrapping jobs may ensure that the data is accurate. As the duration of bootstrap and materializer jobs can vary, a race condition may arise if a materializer job is also queued for execution at or around the same time that the bootstrap job is requested. Issues can arise in such instances when, for example, a snapshot generated at the end of a bootstrap job overwrites a materializer snapshot, or vice versa. This can lead to subsequent materializer jobs utilizing the data as-fixed by the bootstrap job but lacking any updates that occurred during the most recent materializer job. Alternatively, the fixes implemented by the bootstrap job may be overwritten, thus resulting in data that is fresh but in a potentially erroneous state. In other words, since both materializer jobs and bootstrap jobs access the same data snapshot location, their unpredictable order of completion can lead to either the omission of recent updates or the invalidation of implemented fixes. The innovative job coordination system described herein can effectively avoid and/or efficiently resolve such conflicts based on user preferences, as demonstrated with detailed examples below.

Specifically, the job coordination system allows users to choose whether to prioritize data freshness or data accuracy based on their needs, and dynamically updates the logic and execution timing of relevant data management jobs accordingly. For instance, depending on the user's preference, the job coordination system may either execute a bootstrap job and a materializer job in parallel (and/or concurrently) or restrict such jobs to running one at a time in sequence, thus preventing their overlapping execution. In some specific examples, when data accuracy is the preferred priority, bootstrap and materializer jobs will be run in a mutually exclusive manner (i.e., prevented from running at the same time), and when data freshness is the preferred priority, bootstrap and materializer jobs will be allowed to run in parallel. In some implementations, when the job coordination system refrains from preventing the bootstrap and materializer jobs from overlapping, the job coordination system will override the default logic of the bootstrap job to prevent the bootstrap engine from updating a metadata table with information about its snapshot location. In such implementations, as further described below, the job coordination system may store custom metadata associated with the snapshot to be incorporated by a subsequent materializer job when particular conditions are met.

The job coordination system described herein provides several technical benefits over conventional solutions for coordinating data management jobs. As one example, by dynamically switching between parallel and sequential job execution, the job coordination system provides an optimal combination of efficiency and data integrity that grants users the flexibility to prioritize speed or consistency as needed. As another example, by intelligently opting to run jobs sequentially when a user prioritizes data accuracy, reliability, and consistency over having the freshest data available, the job coordination system increases the likelihood that data will flow through the pipeline in the correct order and that all data dependencies will be properly resolved before a particular job executes, thus decreasing the risk of data corruption, inconsistencies, or unexpected outcomes that could arise when jobs are allowed to run concurrently. As another example, by intelligently allowing jobs to run in parallel when a user prioritizes having the freshest data available as quickly as possible, the job coordination system maximizes data throughput, thereby allowing data to be processed at a faster rate compared to sequential processing. In addition, by employing various safeguarding mechanisms when jobs are allowed to run in parallel, the job coordination system avoids data conflicts and inconsistencies that could arise when jobs overlap (e.g., snapshot overwrites). Furthermore, by selectively running data management jobs in a mutually exclusive manner, the job coordination system provides benefits such as ensuring data integrity and consistency by satisfying dependencies between jobs before execution, simplifying debugging and error handling by allowing issues to be more easily isolated, enabling controlled rollbacks when necessary, and preventing resource contention between jobs with varying resource requirements.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for intelligent job processing. Implementations of the subject matter disclosed herein provide specific inventive steps describing how desired results are achieved and realize meaningful and significant improvements on existing computer functionality—that is, the performance of computer-based systems operating in the evolving technological field of intelligent job processing.

FIG. 1 shows a system 100, according to some implementations. Various aspects of the system 100 disclosed herein are generally applicable for selectively running data management jobs in a mutually exclusive manner. The system 100 includes a combination of one or more processors 110, a memory 114 coupled to the one or more processors 110, an interface 120, one or more databases 130, a source database 134, a target database 138, an ingestion adapter 140, an event bus 150, a materializer 160, a bootstrap engine 170, a coordination module 180, a coordination algorithm 184, and/or an action module 190. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device (e.g., of a user), outputting data (e.g., over the communications network) to the computing device of the user, providing a job request interface for the user, outputting job statuses to the computing device of the user, and the like. In some implementations, the interface 120 is used to receive requests for any one or more of an ingestion process, a data management process (such as a materialization process or a bootstrap process), and the like. The interface 120 may also be used to determine a user preference with respect to whether the job coordination system is to prioritize data freshness or data accuracy. The interface 120 may also be used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as source data, target data, data assets, transmissions, requests, preferences, priorities, snapshots, snapshot locations, timestamps, events, algorithms, weights, models, modules, engines, user information, ratios, historical data, recent data, current or real-time data, files, plugins, metadata, arrays, tags, identifiers, prompts, queries, replies, feedback, insights, formats, characteristics, and/or features, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the source database 134, the target database 138, and/or another suitable physical or cloud-based data store. In some implementations, the database 130 includes a relational database capable of presenting information as data sets in tabular form and capable of manipulating the data sets using relational operators.

The one or more source (or "origin") databases 134 store data associated with source (or "origin") data, such as the source data itself, or any other suitable data related to the source data. In some implementations, the source database 134 includes one or more databases that can efficiently handle high-volume, short transactions, including data insertion, updating, and querying, and ensure data integrity and consistency across multi-user environments. In some implementations, the source database 134 includes one or more Online Transaction Processing (OLTP) databases. Example OLTP sources include MySQL, Oracle, Postgres, SQL Server, DynamoDB, S3 Files, SFTP, Domain Events, IPS, Outbox Service, or any other suitable database that can be used for managing high-volume transactions, providing advanced security features, supporting complex queries, enabling data access, securing data transfer, and the like. In various implementations, the source database 134 may be a part of or separate from the database 130 and/or the target database 138. In some instances, the source database 134 includes data stored in one or more cloud object storage services, such as one or more Amazon Web Services (AWS)-based Simple Storage Service (S3) buckets. In some implementations, all or a portion of the data is stored in a memory separate from the source database 134, such as in the database 130 and/or another suitable data store.

The one or more target (or "destination") databases 138 store data associated with target (or "destination") data, such as the target data itself, or any other suitable data related to the target data. In some implementations, the target database 138 includes one or more databases that are ideal for storing vast amounts of historical data that may be used in performing various analytics. For instance, the analytics may include the execution of complex statistical analytical queries submitted by AI expert data analysts. In some implementations, the target database 138 includes one or more DataLakes. To enable fast data retrieval and effective expert analysis of large datasets, the data replicated from the source database 134 is represented in the target database 138 in a columnar format structure, which may incorporate a parquet format in some implementations. In various implementations, the target database 138 may be a part of or separate from the database 130 and/or the source database 134. In some instances, the target database 138 includes data stored in one or more cloud object storage services, such as one or more Amazon Web Services (AWS)-based Simple Storage Service (S3) buckets. In some implementations, all or a portion of the data is stored in a memory separate from the target database 138, such as in the database 130 and/or another suitable data store.

The process of transitioning the source data from its original form in the source database 134 to its replicated form in the target database 138 may be referred to as an ingestion process or a merge process, and particular ingestion-based jobs may include materialization jobs, bootstrap jobs, and the like. The ingestion process may include extracting the source data (e.g., thousands of tables or more) from the source database 134 using one or more adapters (e.g., the ingestion adapter 140) and incorporating the data into one or more event buses (e.g., the event bus 150). In some implementations, the ingestion adapter 140 incorporate one or more aspects of Oracle Golden Gate (OGG) and/or Kafka Connect (KC). In some implementations, the event bus 150 incorporates one or more aspects of change data capture (CDC) to facilitate real-time data integration from the source database 134. Specifically, CDC events may be extracted based on the changes captured from the source database 134 and serialized into a format that includes important information about the associated change, such as a timestamp associated with the change and data before and after the change, and the events may be published to the event bus 150. Following such tasks, subsequent ingestion processes may continue periodically (e.g., by a schedule) and/or by manual initiation.

The materializer 160 may be used to replicate source data from the source database 134 in the target database 138 (e.g., a DataLake). As described above, a materialization job is generally for providing the most up-to-date (or "fresh") data to the target database 138, such as by reading and bringing in the most recent changes (e.g., inserts, updates, and deletes) that occurred in the source database 134 since, by default logic, a most recent checkpoint (e.g., daily, every few hours, or the like) and merging the changes with corresponding datasets in the target database 138. After the merge, the materializer 160 may generate and store a new materializer snapshot (i.e., a point-in-time copy of the associated data assets at an end of the materializer job) of the updated data in the target database 138. In some instances, a dedicated hive table is updated to point to the location of the new snapshot, such as via an "alter table location" command. In some implementations, a materializer job is configured using aspects of Spark. In some aspects, the reading, merging, and generating steps are the most time-consuming steps of the materializer process, while the updating of the new snapshot location may take less than one second.

In an example implementation, a materializer data pipeline may be for real-time processing, where the data is transferred from the event bus 150 to the materializer 160 (e.g., a streaming materializer) and then to a particular target database 138, such as a clean DataLake that stores target data in delta tables to allow immediate access with relatively high data integrity. In another example implementation, a materializer data pipeline may be for cost-effective large-scale analysis and historical reporting, where the data is batched from the event bus 150 to an object storage service (e.g., one or more Amazon S3 buckets), processed by the materializer 160 (e.g., a batch materializer), and stored in a raw DataLake (e.g., in parquet format in hive tables).

The bootstrap engine 170 may be used to replicate source data from the source database 134 in the target database 138 (e.g., the DataLake). As described above, a bootstrap job is generally for establishing and maintaining the accuracy and quality of (e.g., by repairing) data within the target database 138, such as when source data is brought into the DataLake for the first time (an initial load), or when there are data issues that need fixing within existing data. Bootstrapping a DataLake can be done with either a full bootstrap (e.g., where all data in the source database 134 is copied to the target database 138 for initialization or major source data changes) or a partial bootstrap (e.g., focusing on adjustments to specific data subsets to address quality issues within particular time ranges, shards, or primary keys). As a specific example, a table in the source database 134 may be updated to include an email field that suddenly requires encryption or a data type of the table may change in a way that is incompatible with the current state of the DataLake, and in such instances, bootstrapping may be used to bring the DataLake back into alignment with the updated source table.

In some example implementations, the bootstrapping process involves efficiently extracting data from the source database 134 (e.g., in parallel channels), converting the extracted data (e.g., to a columnar Parquet format optimized for DataLakes), loading the converted data directly into the DataLake, and updating the location metadata (e.g., a bootstrap snapshot, i.e., a point-in-time copy of the associated data assets at an end of the bootstrap job) in the DataLake for future accessibility. In some instances, by default logic, a dedicated hive table is updated to point to the location of the new snapshot, such as via an "alter table location" command. By default logic, the location of the bootstrap snapshot may be the same as the materializer snapshot described above. For both materializer jobs and bootstrap jobs, default logic results in a new snapshot being generated when any number of the associated data assets or files (e.g., 100 out of one million) is modified. To prevent duplication issues, the new snapshot will include a new memory location for each file. To note, although certain advancements in modern DataLake technologies (e.g., Delta Lake, Iceberg format, and the like) may offer improved efficiency and manageability, new snapshots will still be generated so as to maintain backward compatibility within the system.

In some implementations, a bootstrap job is configured using aspects of both Java and Spark. For instance, the bootstrap job may be configured to extract the data from the source database 134 in parallel channels using a Java Database Connectivity (JDBC) pull that includes running multiple range (e.g., SQL) queries to retrieve the data from the source database 134 in chunks, locally accumulating the files as intermediate data files, and rewriting the reconciled files to the target database 138 in parquet format using a Spark job. In some aspects, the extracting, converting, and loading steps are the most time-consuming steps of the bootstrapping process, while the updating of the new snapshot location may take less than one second. The time to complete a bootstrap process varies depending on the type (partial or full) and the dataset's size, which can range from a few minutes for partial bootstraps to several hours for full bootstraps on large datasets.

The coordination module 180 may be used in conjunction with the coordination algorithm 184 to actively coordinate the running of different data management jobs (e.g., bootstrap and materialization jobs) in a mutually exclusive manner (or not), such as based on a user's preference for the job coordination system to prioritize data accuracy or data freshness. As a non-limiting example, the job coordination system may receive (e.g., via the interface 120) a transmission from a computing device associated with a user of the job coordination system. The transmission may include a request to perform a job on one or more data assets selected by the user. For example, the user may be requesting that the job coordination system perform a data repair (e.g., bootstrap) job on the one or more data assets. The user may also indicate (e.g., by selecting an option presented to the user via the interface 120) a preference for the job to prioritize a particular data quality. For example, the user may indicate whether the bootstrap job is to prioritize "data accuracy" or "data freshness". In this manner, the coordination module 180 can determine whether to prevent the data repair job from overlapping with, for example, a data update job when the user preference is data accuracy, or to allow the data repair job to overlap with the data update job (which may include performing one or more additional actions) when the user preference is data freshness. To note, the data repair job and the data update job may not actually overlap even when the coordination module 180 "allows" for overlap. In some implementations, preventing the overlap and/or allowing the overlap includes the use of one or more metadata tables stored in the database 130, the target database 138, or the like. In some aspects, the metadata table is stored in the target database 138 and is automatically updated with an entry including details for each respective job run, such as a time that the respective job was requested, a time that the respective job was run, a time that the respective job finished, a location of a snapshot generated after the respective job, a status of the respective job, a user preference (e.g., "data accuracy" or "data freshness") associated with the respective job, a hive table location associated with the respective job, a type of the respective job, or the like, as further described by examples below.

Example scenarios will now be discussed with reference to when the user preference (the "priority") is data accuracy. As one example of preventing the data repair job from overlapping with the data update job (e.g., when the priority is data accuracy), the coordination module 180 in conjunction with the coordination algorithm 184 may maintain at least start times and end times for the data update job in the metadata table. For instance, the data update job may be a materializer job and a materializer entry may be stored in the metadata table and include the information "12:15 pm, started" when the materializer job starts at 12:15 pm; and thereafter, the materializer entry may be updated to include the information "1:00 pm, finished" when the materializer job finishes at 1:00 pm. In this manner, responsive to receiving the request to perform a data repair job (e.g., a bootstrap job for this example), the coordination module 180 may determine whether the data update job is currently running based on the metadata table. For example, if the metadata table includes a materializer entry with a recent time entry associated with "started" and has not yet been updated with a time entry associated with "finished," the coordination module 180 may determine that the materializer job is currently running (such as if the current time is 12:30 pm for the example above). Thereafter, the coordination module 180 selectively allows the data repair job to run based on whether the data update job is currently running. Specifically, the coordination module 180 allows the data repair job to run responsive to determining that the data update job is not currently running, or does not (currently) allow the data repair job to run responsive to determining that the data update job is currently running. In some implementations, when the data repair job is prevented from running, the coordination module 180 queues the data repair job to run after the data update job is finished. After the data repair job runs, the snapshot location associated with the data repair job is updated.

As non-limiting examples of allowing a data repair job (e.g., a bootstrap job) to run responsive to determining that the data update job (e.g., a materializer job) is not currently running, in a first scenario, the priority is "data accuracy," and the bootstrap job is requested to begin at 11 am. If the metadata table indicates that no materializer job is running (such as if the next materializer job is scheduled to begin at 12:15 pm), the bootstrap job will be allowed to start. In a second scenario, the priority is "data accuracy," and the bootstrap job is requested to begin at 1:15 pm. If the metadata table indicates that a materializer job started at 12:15 pm and finished at 1:00 pm, the bootstrap job will be allowed to start.

As non-limiting examples of queuing the data repair job (e.g., a bootstrap job) to run after the data update job (e.g., a materializer job) is finished responsive to determining that the data update job is currently running, in a third scenario, the priority is "data accuracy," and the bootstrap job is requested to begin at 1 pm. If the metadata table indicates that a materializer job started at 12:15 pm and does not include a corresponding "finished" time associated with the materializer job, the bootstrap job will not be allowed to start. Rather, the coordination module 180 will queue the bootstrap job to start immediately after the materializer job finishes. To note, materializer jobs may be subject to various SLAs and may also require a shorter amount of time to complete as compared with bootstrap jobs-thus, it is beneficial to allow the materializer job to finish (rather than interrupting it), and to then allow the bootstrap job to run, as the bootstrap job may require far more time to complete while also not being subject to an SLA. Accordingly, for this scenario, the coordination module 180 determines that the materializer job "finishes" at 2 μm, and thus the bootstrap job will start after 2 μm. In a fourth scenario, the priority is "data accuracy," the bootstrap job is requested to begin at 1 μm, the metadata table indicates that a materializer job started at 12:15 pm and does not include a corresponding "finished" time associated with the materializer job; thus, the bootstrap job will be queued to start after the materializer job finishes, which may be at 1:15 pm for this scenario.

As another example of preventing the data update job from overlapping with the data repair job (e.g., when the priority is data accuracy), the coordination module 180 in conjunction with the coordination algorithm 184 may maintain at least a start time and end time for the data repair job in the metadata table. Furthermore, the metadata table may indicate whether the priority is "data accuracy" or "data freshness" for the particular data repair job. For instance, a bootstrap entry may be stored in the metadata table and include the information "data accuracy priority" and "11:00 am, started" when the associated bootstrap job starts at 11:00 am with a user preference of data accuracy. The bootstrap entry may then be updated to include the information "12:30 pm, finished" when the associated bootstrap job finishes at 12:30 pm. In this manner, responsive to an initialization of a materializer job (e.g., a materializer job scheduled to run at 12:00 pm), the coordination module 180 can use the metadata table to determine if a bootstrap job is currently running and to determine a data priority associated with the bootstrap job (if any). Thereafter, the coordination module 180 selectively allows the bootstrap job to run based on the data priority and whether the materializer job is currently running. Specifically, when the priority is data accuracy, the coordination module 180 allows the materializer job to run responsive to determining that the bootstrap job is not currently running, or prevents the materializer job from running responsive to determining that the bootstrap job is currently running. As the priority is data accuracy, rather than immediately triggering an extra materializer job, the coordination module 180 may allow a regularly scheduled materializer job to run as normal, which will eventually make the data consistent through its standard operation.

As non-limiting examples of preventing the data update job (e.g., materializer job) from running responsive to determining that the data repair job (e.g., bootstrap job) is currently running, in a fifth scenario, the priority is "data accuracy," and the bootstrap job is requested to begin at 11 am. If the metadata table indicates that no materializer job is running, the coordination module 180 will allow the bootstrap job to start. For this scenario, a materializer job is scheduled to run (and so may attempt to initialize) at 12:15 pm. However, upon using the metadata table to determine that the bootstrap job is still running (such as if the bootstrap job finishes at 12:30 pm) and that "data accuracy" is the priority, the coordination module 180 will prevent the materializer job from running. Although some data freshness will be lost (e.g., until the next scheduled materializer run), the job coordination system properly honors the priority of data accuracy. In some implementations not shown, such as when data freshness is nearly as important as data accuracy, the materializer job will be queued to run after the bootstrap job finishes. Similarly, in a sixth scenario, the priority is "data accuracy," and the bootstrap job is requested to begin at 11 am. If the metadata table indicates that no materializer job is running, the bootstrap job will be allowed to start. For this scenario, a materializer job attempts to initialize at 12:15 pm. However, upon using the metadata table to determine that the bootstrap job is still running (such as if the bootstrap job finishes at 1:30 pm) and that "data accuracy" is the priority, the coordination module 180 will prevent the materializer job from running.

Example scenarios will now be discussed with reference to when the user preference (the "priority") is data freshness. As one example of allowing the data repair job to overlap with the data update job, the coordination module 180 in conjunction with the coordination algorithm 184 may, when determining that the priority is data freshness (such as based on the user preference and/or the metadata table), proceed to run the data repair job (e.g., bootstrap job) in parallel with the data update job (e.g., materializer job). To note, the bootstrap job and the materializer job may be configured (by default) to update a metadata table (e.g., a hive table) with their snapshot location at the end of their respective jobs. When the priority is data freshness and the bootstrap job is run in parallel with the materializer job, the coordination module 180 may prevent the snapshot path location associated with the bootstrap job from being updated. That is, the coordination module 180 will override the default logic for the bootstrap job and ensure that a location of the bootstrap data that was written is stored in the metadata table. In some implementations, the location of the bootstrap data is an Amazon S3 location, and the bootstrap data is stored in the metadata table as custom metadata identifying a custom location of a snapshot for the bootstrap job. In this manner, a location of the bootstrap job's snapshot is stored (e.g., for future reference), while the system's official "snapshot location" (e.g., as referenced by other system components) remains unchanged.

In some instances, when refraining from updating the snapshot location associated with the data repair job, the job coordination system incorporates the snapshot of the data repair job (e.g., a bootstrap job) into a subsequent data update job (e.g., a materializer job) based at least in part on the custom metadata. As mentioned above, a metadata table may be maintained that includes at least start times and end times for the data repair job and the data update job. Thus, when the bootstrap job writes to the target database 138, an example entry stored in the metadata table for the bootstrap job may include "data freshness preference, 11:00 am started, 12:30 pm finished, snapshot location>1706124014212~1," thus storing the "priority" associated with the bootstrap job (i.e., data freshness for this example), the time the bootstrap job started (i.e., 11:00 am for this example), the time the bootstrap job finished (i.e., 12:30 pm for this example), and a location of the bootstrap job's snapshot (i.e., 1706124014212~1 for this example) for future reference. Notably, for this example, the snapshot currently being used system-wide may be located at 1706124014212~0, but the metadata hive table that stores this system-wide information will not be updated with 1706124014212~1 at this time. Thereafter, responsive to an initialization of the subsequent data update job (e.g., the next scheduled materializer job), the coordination module 180 determines whether the end time of the data repair job (e.g., the bootstrap job) occurred after the start time of the (previous) data update job based on the metadata table. For this example, when the next materializer job (now the "current materializer job" for this example) initializes on data assets associated with the bootstrap job described above, and if the "data freshness" was the priority (as the job coordination system will determine based on the metadata table described above), then whether the current materializer job uses the snapshot located at 1706124014212~0 or the snapshot located at 1706124014212~1 will depend on the timestamps stored in the metadata table for the previous materializer job and the bootstrap job described above. In other words, the coordination module 180 selectively uses a snapshot for the data repair job as a baseline for the subsequent data update job based on whether the end time of the data repair job occurred after the start time of the data update job. Thus, for this example, if the metadata table indicates that the end time of the bootstrap job (i.e., 12:30 pm) occurred after the start time of the previous materializer job (e.g., 12:15 pm), then the snapshot for the bootstrap job (i.e., as stored at 1706124014212~0) will be used as a baseline for the current materializer job. To note, when the snapshot for the data repair job is used as a baseline for the subsequent data update job, the subsequent data update job will also use the start time of the data repair job (i.e., 11:00 am for this example) as a checkpoint. In contrast, for this example, if the metadata table indicates that the end time of the bootstrap job (i.e., 12:30 pm) did not occur after the start time of the previous materializer job (e.g., if the previous materializer job started at 1:00 pm), then the snapshot for the bootstrap job (i.e., as stored at location 1706124014212~0) will not be used as the baseline for the current materializer job-rather, the current materializer job will use the snapshot stored at location 1706124014212~1, as indicated by the system-wide metadata hive table.

Thus, for the first scenario described above, when the user preference is instead "data freshness," the coordination module 180 in conjunction with the coordination algorithm 184 will determine that the end time of the data repair job (i.e., 12:00 pm for the first scenario) did not occur after the start time of the data update job (i.e., 12:15 pm for the first scenario), and thus, the coordination module 180 will refrain from using the snapshot for the data repair job as the baseline for the subsequent data update job. In contrast, for the second scenario described above, when the user preference is "data freshness," the coordination module 180 will determine that the end time of the data repair job (i.e., 2:00 pm for the second scenario) did not occur after the start time of the data update job (i.e., 12:15 pm for the second scenario), and thus, the coordination module 180 will retrieve, from the custom location identified in the custom metadata, the snapshot for the data repair job, and use the retrieved snapshot as the baseline for the subsequent data update job. In this manner, the previous materializer job is allowed to finish while meeting its SLA (ensuring data freshness is prioritized), and the fixes affected by the bootstrap job will eventually be incorporated (i.e., by the subsequent materializer job). Similarly, for the third scenario described above, when the user preference is "data freshness," the coordination module 180 will determine that the end time of the data repair job (i.e., 1:30 pm for the third scenario) did not occur after the start time of the data update job (i.e., 12:15 pm for the third scenario), and thus, the coordination module 180 will retrieve the snapshot for the data repair job from the custom location and use the retrieved snapshot as the baseline for the subsequent data update job. Similarly, for the fourth scenario described above, when the user preference is "data freshness," the coordination module 180 will determine that the end time of the data repair job (i.e., 1:30 pm for the fourth scenario) did not occur after the start time of the data update job (i.e., 12:15 pm for the fourth scenario), and thus, the coordination module 180 will retrieve the snapshot for the data repair job from the custom location and use the retrieved snapshot as the baseline for the subsequent data update job. Similarly, for the fifth scenario described above, when the user preference is "data freshness," the coordination module 180 will determine that the end time of the data repair job (i.e., 12:30 pm for the fifth scenario) did not occur after the start time of the data update job (i.e., 12:15 pm for the fifth scenario), and thus, the coordination module 180 will retrieve the snapshot for the data repair job from the custom location and use the retrieved snapshot as the baseline for the subsequent data update job. Similarly, for the sixth scenario described above, when the user preference is "data freshness," the coordination module 180 will determine that the end time of the data repair job (i.e., 1:30 pm for the sixth scenario) did not occur after the start time of the data update job (i.e., 12:15 pm for the sixth scenario), and thus, the coordination module 180 will retrieve the snapshot for the data repair job from the custom location and use the retrieved snapshot as the baseline for the subsequent data update job.

The ingestion adapter 140, the event bus 150, the materializer 160, the bootstrap engine 170, the coordination module 180, the coordination algorithm 184, and/or the action module 190 are implemented in software, hardware, or a combination thereof. In some implementations, any one or more of the ingestion adapter 140, the event bus 150, the materializer 160, the bootstrap engine 170, the coordination module 180, the coordination algorithm 184, or the action module 190 is embodied in instructions that, when executed by the processor 110, cause the system 100 to perform operations. In various implementations, the instructions of one or more of said components, the interface 120, the source database 134, and/or target database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to selectively running data management jobs in a mutually exclusive manner are described with reference to the system 100, other suitable system configurations may be used.

Figure 2:
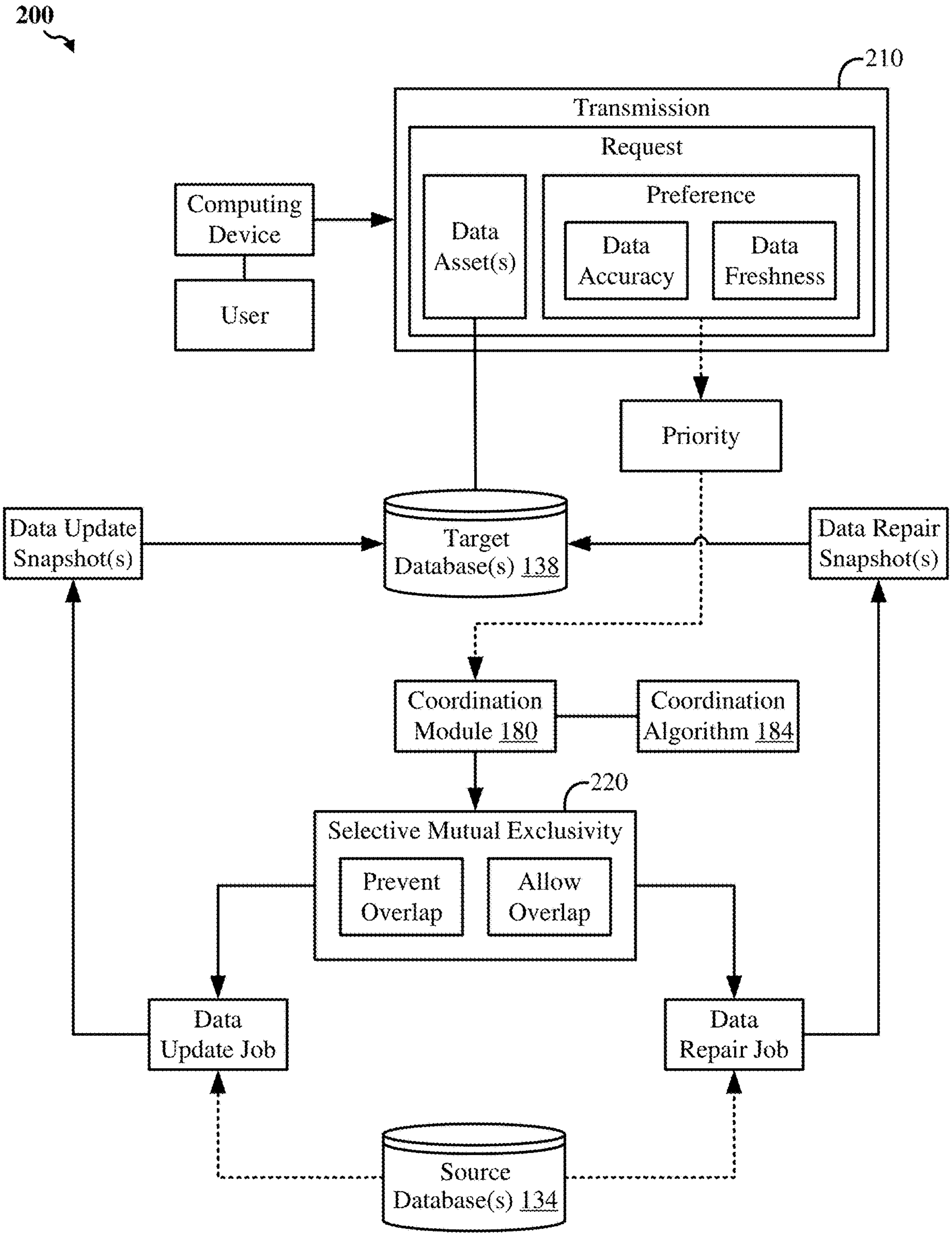
FIG. 2 shows a high-level overview of an example process flow employed by a system, according to some implementations.

FIG. 2 shows a high-level overview of an example process flow 200 employed by a system, according to some implementations, during which data management jobs are selectively run in a mutually exclusive manner. In various implementations, the system is a job coordination system and incorporates one or more (or all) aspects of the system 100. In some implementations, various aspects described with respect to FIG. 1 are not incorporated, such as the source database 134, the target database 138, the ingestion adapter 140, the event bus 150, the materializer 160, the bootstrap engine 170, and/or the action module 190. For instance, in some implementations, the coordination module 180 in conjunction with the coordination algorithm 184 intelligently determines whether to run a data repair job and a data update job in a mutually exclusive manner, and transmits instructions coordinating the performance of such actions.

At block 210, a transmission is received (e.g., via the interface 120) over a communications network from a computing device associated with a user of the system 100. The transmission may include a request to perform a data repair job (e.g., a bootstrap job) on one or more data assets (e.g., stored in the target database 138). The transmission may further include a user preference indicating whether data accuracy or data freshness is to be prioritized in the event of a scheduled data update job (e.g., a materializer job). The user preference/priority may be provided to the coordination module 180 for further processing. The materialization job may be performed by the materializer 160, and the bootstrap job may be performed by the bootstrap engine 170. In some implementations, the jobs are associated with the ingestion of data from the source database 134 to the target database 138, which may include operations performed by one or more components not shown for simplicity, such as one or more ingestion adapters (e.g., the ingestion adapter 140) and/or one or more event buses (e.g., the event bus 150). In some instances, the one or more source databases 134 include at least one Online Transaction Processing (OLTP) database. In some other instances, the one or more target databases 138 include at least one DataLake.

At block 220, the coordination module 180 in conjunction with the coordination algorithm 184 selectively runs the data repair job and the data update job in a mutually exclusive manner based on the user preference.

In some implementations, selectively running the data repair job and the data update job in a mutually exclusive manner includes the coordination module 180 in conjunction with the coordination algorithm 184 preventing the data repair job from overlapping with the data update job when the user preference is data accuracy. In some of such implementations, preventing the data repair job from overlapping with the data update job includes maintaining a metadata table including at least start times and end times for the data update job, responsive to receiving the request to perform the data repair job, determining whether the data update job is currently running based on the metadata table, selectively allowing the data repair job to run based on whether the data update job is currently running, and updating a snapshot location associated with the data repair job at an end of the data repair job. In some aspects, the selective allowing includes allowing the data repair job to run responsive to determining that the data update job is not currently running, and queuing the data repair job to run after the data update job is finished responsive to determining that the data update job is currently running. In some other of such implementations, preventing the data repair job from overlapping with the data update job includes maintaining a metadata table including at least a start time and end time for the data repair job, responsive to an initialization of the data update job, determining whether the data repair job is currently running based on the metadata table, and selectively allowing the data update job to run based on whether the data repair job is currently running. In some aspects, the selective allowing includes allowing the data update job to run responsive to determining that the data repair job is not currently running, and preventing the data update job from running responsive to determining that the data repair job is currently running.

In some other implementations, selectively running the data repair job and the data update job in a mutually exclusive manner includes the coordination module 180 in conjunction with the coordination algorithm 184 allowing the data repair job to overlap with the data update job when the user preference is data freshness. In some of such implementations, allowing the data repair job to overlap with the data update job includes running the data repair job in parallel with the data update job, and refraining from updating a snapshot location associated with the data repair job. In some aspects, the data repair job and the data update job, by default logic, update a metadata table with their snapshot location at the end of their respective jobs, and refraining from updating the snapshot location associated with the data repair job includes overriding the default logic for the data repair job. In some instances, responsive to refraining from updating the snapshot location associated with the data repair job, the job coordination system stores custom metadata identifying a custom location of a snapshot for the data repair job. In some instances, the job coordination system incorporates the snapshot of the data repair job into a subsequent data update job based at least in part on the custom metadata. In some aspects, incorporating the snapshot of the data repair job into the subsequent data update job includes maintaining a metadata table including at least start times and end times for the data repair job and the data update job, responsive to an initialization of the subsequent data update job, determining whether the end time of the data repair job occurred after the start time of the data update job based on the metadata table, and selectively using a snapshot for the data repair job as a baseline for the subsequent data update job based on whether the end time of the data repair job occurred after the start time of the data update job. In some implementations, selectively using the snapshot for the data repair job as the baseline for the subsequent data update job includes responsive to determining that the end time of the data repair job occurred after the start time of the data update job, retrieving, from the custom location identified in the custom metadata, the snapshot for the data repair job, and using the retrieved snapshot as the baseline for the subsequent data update job, and responsive to determining that the end time of the data repair job did not occur after the start time of the data update job, refraining from using the snapshot for the data repair job as the baseline for the subsequent data update job. In some aspects, incorporating the snapshot of the data repair job into the subsequent data update job further includes using the start time of the data repair job as a checkpoint for the subsequent data update job.

Figure 3:
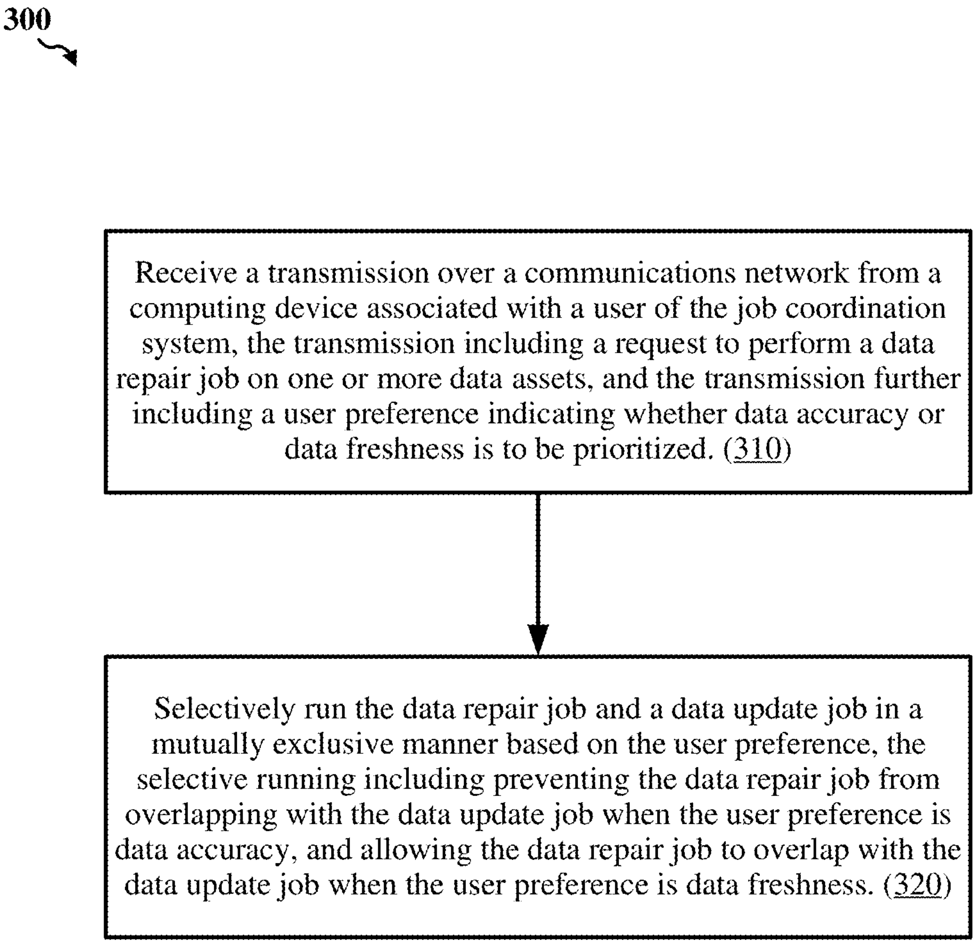
FIG. 3 shows an illustrative flowchart depicting an example operation for selectively running data management jobs in a mutually exclusive manner, according to some implementations.

FIG. 3 shows a high-level overview of an example process flow 300 employed by the system 100 of FIG. 1 and/or the system described with respect to FIGS. 2, according to some implementations, during which data management jobs are selectively run in a mutually exclusive manner. At block 310, the system 100 receives a transmission over a communications network from a computing device associated with a user of the job coordination system, the transmission including a request to perform a data repair job on one or more data assets, and the transmission further including a user preference indicating whether data accuracy or data freshness is to be prioritized. At block 320, the system 100 selectively runs the data repair job and a data update job in a mutually exclusive manner based on the user preference, the selective running including preventing the data repair job from overlapping with the data update job when the user preference is data accuracy, and allowing the data repair job to overlap with the data update job when the user preference is data freshness.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for selectively running data management jobs in a mutually exclusive manner, the method performed by one or more processors of a job coordination system and comprising:

receiving a transmission over a communications network from a computing device associated with a user of the job coordination system, the transmission including a request to perform a data repair job on one or more data assets, and the transmission further including a user preference indicating whether data accuracy or data freshness is to be prioritized; and selectively running the data repair job and a data update job in a mutually exclusive manner based on the user preference, the selective running including:

preventing the data repair job from overlapping with the data update job when the user preference is data accuracy; and allowing the data repair job to overlap with the data update job when the user preference is data freshness.

2. The method of claim 1, wherein preventing the data repair job from overlapping with the data update job includes:

maintaining a metadata table including at least start times and end times for the data update job;

responsive to receiving the request to perform the data repair job, determining whether the data update job is currently running based on the metadata table;

selectively allowing the data repair job to run based on whether the data update job is currently running, the selective allowing including:

allowing the data repair job to run responsive to determining that the data update job is not currently running; and queuing the data repair job to run after the data update job is finished responsive to determining that the data update job is currently running; and updating a snapshot location associated with the data repair job at an end of the data repair job.

3. The method of claim 1, wherein preventing the data repair job from overlapping with the data update job includes:

maintaining a metadata table including at least a start time and end time for the data repair job;

responsive to an initialization of the data update job, determining whether the data repair job is currently running based on the metadata table; and selectively allowing the data update job to run based on whether the data repair job is currently running, the selective allowing including:

allowing the data update job to run responsive to determining that the data repair job is not currently running; and preventing the data update job from running responsive to determining that the data repair job is currently running.

4. The method of claim 1, wherein allowing the data repair job to overlap with the data update job includes:

running the data repair job in parallel with the data update job; and refraining from updating a snapshot location associated with the data repair job.

5. The method of claim 4, wherein the data repair job and the data update job, by default logic, update a metadata table with their snapshot location at the end of their respective jobs, and wherein refraining from updating the snapshot location associated with the data repair job includes overriding the default logic for the data repair job.

6. The method of claim 5, the method further comprising:

responsive to refraining from updating the snapshot location associated with the data repair job, storing custom metadata identifying a custom location of a snapshot for the data repair job.

7. The method of claim 6, the method further comprising:

incorporating the snapshot of the data repair job into a subsequent data update job based at least in part on the custom metadata.

8. The method of claim 7, wherein incorporating the snapshot of the data repair job into the subsequent data update job includes:

maintaining a metadata table including at least start times and end times for the data repair job and the data update job;

responsive to an initialization of the subsequent data update job, determining whether the end time of the data repair job occurred after the start time of the data update job based on the metadata table; and selectively using a snapshot for the data repair job as a baseline for the subsequent data update job based on whether the end time of the data repair job occurred after the start time of the data update job.

9. The method of claim 8, wherein selectively using the snapshot for the data repair job as the baseline for the subsequent data update job includes:

responsive to determining that the end time of the data repair job occurred after the start time of the data update job, retrieving, from the custom location identified in the custom metadata, the snapshot for the data repair job, and using the retrieved snapshot as the baseline for the subsequent data update job; and responsive to determining that the end time of the data repair job did not occur after the start time of the data update job, refraining from using the snapshot for the data repair job as the baseline for the subsequent data update job.

10. The method of claim 8, wherein incorporating the snapshot of the data repair job into the subsequent data update job further includes:

using the start time of the data repair job as a checkpoint for the subsequent data update job.

11. A system for selectively running data management jobs in a mutually exclusive manner, the system comprising:

one or more processors; and at least one memory coupled to the one or more processors and storing instructions that, when executed by the one or more processors, cause the system to perform operations including:

receiving a transmission over a communications network from a computing device associated with a user of the system, the transmission including a request to perform a data repair job on one or more data assets, and the transmission further including a user preference indicating whether data accuracy or data freshness is to be prioritized; and selectively running the data repair job and a data update job in a mutually exclusive manner based on the user preference, the selective running including:

preventing the data repair job from overlapping with the data update job when the user preference is data accuracy; and allowing the data repair job to overlap with the data update job when the user preference is data freshness.

12. The system of claim 11, wherein preventing the data repair job from overlapping with the data update job includes:

maintaining a metadata table including at least start times and end times for the data update job;

responsive to receiving the request to perform the data repair job, determining whether the data update job is currently running based on the metadata table;

selectively allowing the data repair job to run based on whether the data update job is currently running, the selective allowing including:

allowing the data repair job to run responsive to determining that the data update job is not currently running; and queuing the data repair job to run after the data update job is finished responsive to determining that the data update job is currently running; and updating a snapshot location associated with the data repair job at an end of the data repair job.

13. The system of claim 11, wherein preventing the data repair job from overlapping with the data update job includes:

maintaining a metadata table including at least a start time and end time for the data repair job;

responsive to an initialization of the data update job, determining whether the data repair job is currently running based on the metadata table; and selectively allowing the data update job to run based on whether the data repair job is currently running, the selective allowing including:

allowing the data update job to run responsive to determining that the data repair job is not currently running; and preventing the data update job from running responsive to determining that the data repair job is currently running.

14. The system of claim 11, wherein allowing the data repair job to overlap with the data update job includes:

running the data repair job in parallel with the data update job; and refraining from updating a snapshot location associated with the data repair job.

15. The system of claim 14, wherein the data repair job and the data update job, by default logic, update a metadata table with their snapshot location at the end of their respective jobs, and wherein refraining from updating the snapshot location associated with the data repair job includes overriding the default logic for the data repair job.

16. The system of claim 15, wherein execution of the instructions causes the system to perform operations further including:

responsive to refraining from updating the snapshot location associated with the data repair job, storing custom metadata identifying a custom location of a snapshot for the data repair job.

17. The system of claim 16, wherein execution of the instructions causes the system to perform operations further including:

incorporating the snapshot of the data repair job into a subsequent data update job based at least in part on the custom metadata.

18. The system of claim 17, wherein incorporating the snapshot of the data repair job into the subsequent data update job includes:

maintaining a metadata table including at least start times and end times for the data repair job and the data update job;

responsive to an initialization of the subsequent data update job, determining whether the end time of the data repair job occurred after the start time of the data update job based on the metadata table; and selectively using a snapshot for the data repair job as a baseline for the subsequent data update job based on whether the end time of the data repair job occurred after the start time of the data update job.

19. The system of claim 18, wherein selectively using the snapshot for the data repair job as the baseline for the subsequent data update job includes:

responsive to determining that the end time of the data repair job occurred after the start time of the data update job, retrieving, from the custom location identified in the custom metadata, the snapshot for the data repair job, and using the retrieved snapshot as the baseline for the subsequent data update job; and responsive to determining that the end time of the data repair job did not occur after the start time of the data update job, refraining from using the snapshot for the data repair job as the baseline for the subsequent data update job.

20. The system of claim 18, wherein incorporating the snapshot of the data repair job into the subsequent data update job further includes:

using the start time of the data repair job as a checkpoint for the subsequent data update job.

* * * * *